United States Patent
Padilla (10) Patent No.: US 9,976,285 B2
(45) Date of Patent: May 22, 2018

(54) EXCAVATING IMPLEMENT HEADING CONTROL

(71) Applicant: Caterpillar Trimble Control Technologies LLC, Dayton, OH (US)

(72) Inventor: Christopher A. Padilla, Chillicothe, IL (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 1 day.

(21) Appl. No.: 15/221,188

(22) Filed: Jul. 27, 2016

(65) Prior Publication Data

US 2018/0030693 A1 Feb. 1, 2018

(51) Int. Cl.
| | |
|---|---|
| *E02F 9/26* | (2006.01) |
| *G01C 9/02* | (2006.01) |
| *G01S 19/13* | (2010.01) |
| *E02F 3/32* | (2006.01) |
| *E02F 3/40* | (2006.01) |

(52) U.S. Cl.
CPC ............... *E02F 9/264* (2013.01); *E02F 3/32* (2013.01); *E02F 3/40* (2013.01); *G01C 9/02* (2013.01); *G01S 19/13* (2013.01)

(58) Field of Classification Search
CPC .... E02F 9/264; E02F 3/32; E02F 3/40; G01C 9/02; G01S 19/13
USPC ......................................................... 701/50
See application file for complete search history.

(56) References Cited

U.S. PATENT DOCUMENTS

| | | | | |
|---|---|---|---|---|
| 5,424,623 | A | * | 6/1995 | Allen ....................... B25J 9/162 180/324 |
| 7,578,079 | B2 | | 8/2009 | Furem |
| 7,810,260 | B2 | | 10/2010 | Pope et al. |
| 8,689,471 | B2 | | 4/2014 | Carpenter et al. |
| 9,080,481 | B2 | * | 7/2015 | Takebayashi ........... F02D 29/04 |

(Continued)

FOREIGN PATENT DOCUMENTS

| | | |
|---|---|---|
| EP | 3020868 A1 | 5/2016 |
| WO | 9530817 A1 | 11/1995 |

OTHER PUBLICATIONS

U.S. Appl. No. 15/013,044 filed Feb. 2, 2016, not yet published (and as stored in USPTO's IFW).

(Continued)

*Primary Examiner* — Atul Trivedi
(74) *Attorney, Agent, or Firm* — Dinsmore & Shohl, LLP (57) ABSTRACT

An excavator includes a chassis, an implement, control architecture, and an assembly to swing with, or relative to, the chassis and including a boom, stick to curl relative to the boom, and coupling between the implement and stick. The implement rotates about an axis R such that a leading edge LE defines a heading Î. The control architecture comprises sensors, actuators, and controllers to utilize sensor signals to generate a LE position relative to a reference based on reference data and map information, utilize sensor implement edge signals and the excavator position relative to the reference and map information to generate a nearest implement edge (NIE) signal indicative of a LE NIE position relative to the reference, and utilize the actuators for divertive implement rotation about R to adjust Î to account for divertive rotation away from an actual or projected overlap of the NIE and reference.

20 Claims, 4 Drawing Sheets

(56) References Cited

U.S. PATENT DOCUMENTS

| | | | |
|---|---|---|---|
| 9,347,203 B2* | 5/2016 | Tsuruga | E02F 9/2091 |
| 9,540,793 B2* | 1/2017 | Kami | E02F 9/2033 |
| 9,551,129 B2* | 1/2017 | Kami | E02F 3/435 |
| 9,617,709 B2* | 4/2017 | Shintani | E02F 9/262 |
| 9,651,061 B2* | 5/2017 | Matsuzaki | F15B 1/033 |
| 9,676,073 B2* | 6/2017 | Schubert | B23Q 17/2233 |
| 9,725,874 B2* | 8/2017 | Meguriya | E02F 3/437 |
| 9,732,502 B2* | 8/2017 | Fletcher | E02F 9/261 |
| 2004/0158355 A1 | 8/2004 | Holmqvist et al. | |
| 2005/0166413 A1* | 8/2005 | Crampton | B25J 13/088 |
| | | | 33/503 |
| 2005/0177292 A1* | 8/2005 | Okamura | E02F 9/2207 |
| | | | 701/50 |
| 2006/0042810 A1 | 3/2006 | Pecchio | |
| 2008/0000111 A1 | 1/2008 | Green | |
| 2008/0047170 A1 | 2/2008 | Nichols | |
| 2009/0158625 A1* | 6/2009 | Pope | E02F 3/3677 |
| | | | 37/443 |
| 2012/0283919 A1* | 11/2012 | Kuras | B60L 11/005 |
| | | | 701/50 |
| 2014/0032057 A1* | 1/2014 | Li | E02F 9/2246 |
| | | | 701/50 |
| 2014/0116735 A1* | 5/2014 | Bassett | A01B 61/044 |
| | | | 172/2 |
| 2015/0233086 A1* | 8/2015 | Takaura | E02F 3/435 |
| | | | 414/685 |
| 2015/0240446 A1* | 8/2015 | Takaura | E02F 9/22 |
| | | | 414/685 |
| 2015/0240454 A1* | 8/2015 | Yogita | F02D 41/021 |
| | | | 414/685 |
| 2016/0059412 A1* | 3/2016 | Oleynik | B25J 9/163 |
| | | | 700/257 |
| 2016/0069040 A1* | 3/2016 | Kami | E02F 3/437 |
| | | | 701/50 |
| 2016/0168822 A1* | 6/2016 | White | G01C 19/00 |
| | | | 60/413 |
| 2016/0215475 A1* | 7/2016 | Meguriya | E02F 3/32 |
| 2016/0244950 A1* | 8/2016 | Kami | E02F 9/2033 |
| 2016/0273186 A1* | 9/2016 | Kami | E02F 3/435 |
| 2017/0058488 A1* | 3/2017 | Wright | E02F 9/2004 |

OTHER PUBLICATIONS

International Search Report and Written Opinion dated Nov. 2, 2017 pertaining to International Application No. PCT/2017/043495.

* cited by examiner

EXCAVATING IMPLEMENT HEADING CONTROL

BACKGROUND

The present disclosure relates to excavators which, for the purposes of defining and describing the scope of the present application, comprise an excavating implement that is subject to swing and curl control with the aid of an excavator boom and excavator stick, or other similar components for executing swing and curl movement. For example, and not by way of limitation, many types of excavators comprise a hydraulically or pneumatically controlled excavating implement that can be manipulated by controlling the swing and curl functions of an excavating linkage assembly of the excavator. Excavator technology is, for example, well represented by the disclosures of U.S. Pat. No. 8,689,471, which is assigned to Caterpillar Trimble Control Technologies LLC and discloses methodology for sensor-based automatic control of an excavator, US 2008/0047170, which is assigned to Caterpillar Trimble Control Technologies LLC and discloses an excavator 3D laser system and radio positioning guidance system configured to guide a cutting edge of an excavator bucket with high vertical accuracy, and US 2008/0000111, which is assigned to Caterpillar Trimble Control Technologies LLC and discloses methodology for an excavator control system to determine an orientation of an excavator sitting on a sloped site, for example.

BRIEF SUMMARY

According to the subject matter of the present disclosure, an excavator comprises a machine chassis, an excavating linkage assembly, a rotary excavating implement, and control architecture. The excavating linkage assembly comprises an excavator boom, an excavator stick, and an implement coupling. The excavating linkage assembly is configured to swing with, or relative to, the machine chassis. The excavator stick is configured to curl relative to the excavator boom. The rotary excavating implement is mechanically coupled to the excavator stick by the implement coupling and configured to rotate about a rotary axis R such that a leading edge of the rotary excavating implement defines an implement heading $\hat{I}$. The control architecture comprises one or more dynamic sensors, one or more linkage assembly actuators, and one or more controllers programmed to execute machine readable instructions to utilize position signals from the dynamic sensors to generate a position of the leading edge of the rotary excavating implement relative to an obstacle reference, at least partially based on obstacle reference data from a grade control database, and map information from the grade control database, utilize implement edge signals from the dynamic sensors and the position of the excavator relative to the obstacle reference and the map information to generate a nearest implement edge signal indicative of a position of a nearest implement edge of the leading edge of the rotary excavating implement relative to the obstacle reference, and utilize the linkage assembly actuators for divertive rotation of the rotary excavating implement about the rotary axis R to adjust the implement heading $\hat{I}$. The degree of divertive rotation about the rotary axis R is sufficient to account for divertive rotation away from substantially all of an actual or projected overlap of the nearest implement edge with the obstacle reference.

In accordance with one embodiment of the present disclosure, a method of automating tilt and rotation of a rotary excavating implement of an excavator comprises providing an excavator that may include a machine chassis, an excavating linkage assembly, a rotary excavating implement, and control architecture comprising one or more dynamic sensors, one or more linkage assembly actuators, and one or more controllers. The excavating linkage assembly comprises an excavator boom, an excavator stick, and an implement coupling. The excavating linkage assembly is configured to swing with, or relative to, the machine chassis about a swing axis S of the excavator. The excavator stick is configured to curl relative to the excavator boom. The rotary excavating implement is mechanically coupled to the excavator stick by the implement coupling and is configured to rotate about a rotary axis R such that a leading edge of the rotary excavating implement defines an implement heading $\hat{I}$. The method comprises utilizing position signals from the dynamic sensors to generate a position of the leading edge of the rotary excavating implement relative to an obstacle reference, at least partially based on obstacle reference data from a grade control database, and map information from the grade control database, utilizing implement edge signals from the dynamic sensors and the position of the excavator relative to the obstacle reference and the map information to generate a nearest implement edge signal indicative of a position of a nearest implement edge of the leading edge of the rotary excavating implement relative to the obstacle reference, and utilizing the linkage assembly actuators for divertive rotation of the rotary excavating implement about the rotary axis R to adjust the implement heading $\hat{I}$. The degree of divertive rotation about the rotary axis R is sufficient to account for divertive rotation away from substantially all of an actual or projected overlap of the nearest implement edge with the obstacle reference.

In accordance with another embodiment of the present disclosure, a grade control system comprises an excavator and a grade control database. The grade control database comprises map information and obstacle reference data comprising an obstacle reference. The excavator comprises a machine chassis, an excavating linkage assembly, a rotary excavating implement, and control architecture. The excavating linkage assembly comprises an excavator boom, an excavator stick, and an implement coupling. The excavating linkage assembly is configured to swing with, or relative to, the machine chassis. The excavator stick is configured to curl relative to the excavator boom. The rotary excavating implement is mechanically coupled to the excavator stick by the implement coupling and is configured to rotate about a rotary axis R such that a leading edge of the rotary excavating implement defines an implement heading $\hat{I}$. The control architecture comprises one or more dynamic sensors, one or more linkage assembly actuators, and one or more controllers programmed to execute machine readable instructions to utilize position signals from the dynamic sensors to generate a position of the leading edge of the rotary excavating implement relative the obstacle reference and the map information from the grade control database, utilize implement edge signals from the dynamic sensors and the position of the excavator relative to the obstacle reference and the map information to generate a nearest implement edge signal indicative of a position of a nearest implement edge of the leading edge of the rotary excavating implement relative to the obstacle reference, and utilize the linkage assembly actuators for divertive rotation of the rotary excavating implement about the rotary axis R to adjust the implement heading $\hat{I}$. The degree of divertive rotation about the rotary axis R is sufficient to account for divertive rotation away from substantially all of an actual or projected overlap of the nearest implement edge with the obstacle reference.

Figure 1:
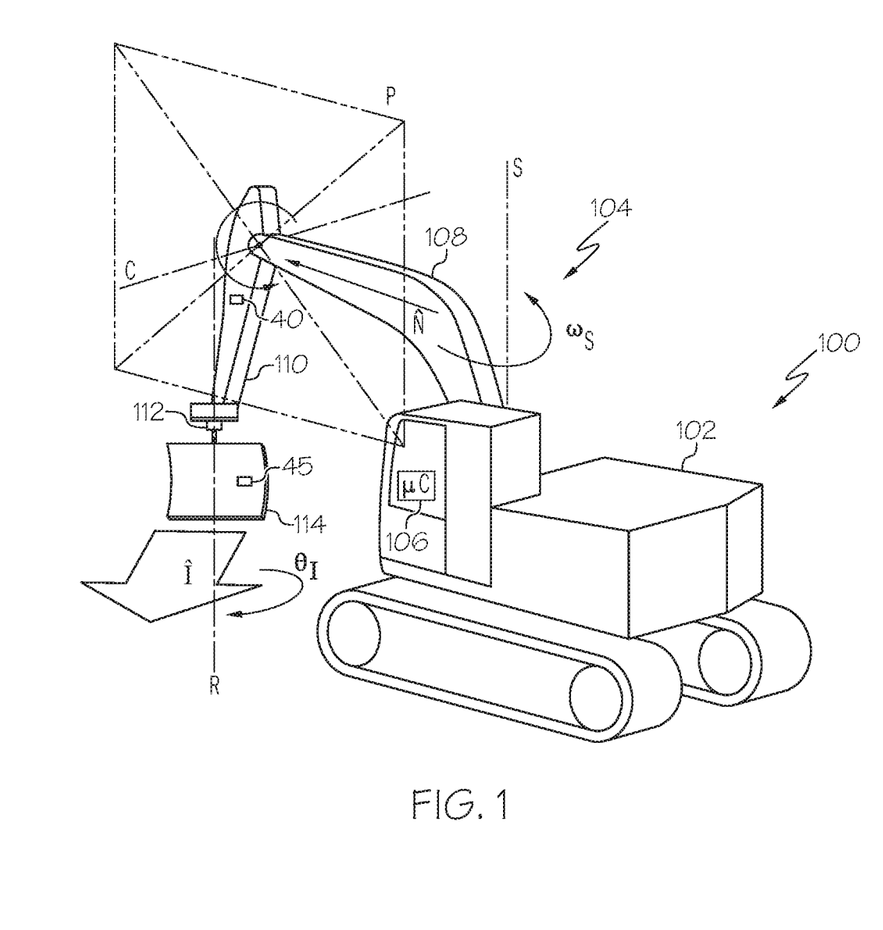
FIG. 1 illustrates an excavator incorporating aspects of the present disclosure.

Although the concepts of the present disclosure are described herein with primary reference to the excavator illustrated in FIG. 1, it is contemplated that the concepts will enjoy applicability to any type of excavator, regardless of its particular mechanical configuration. For example, and not by way of limitation, the concepts may enjoy applicability to a backhoe loader including a backhoe linkage.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Referring initially to FIG. 1, which illustrates an excavator 100, it is noted that excavators according to the present disclosure will typically comprise a machine chassis 102, an excavating linkage assembly 104, a rotary excavating implement 114 (e.g., a rotating bucket comprising a cutting edge), and control architecture 106. The excavating linkage assembly 104 may comprise an excavator boom 108, an excavator stick 110, and an implement coupling 112. As non-limiting examples, it is contemplated that the implement coupling 112 may comprise a tilt-rotator attachment such as the Rototilt® RT 60B coupling sold by Indexator AB, of Vindeln, Sweden, and the excavator boom 108 may comprise a variable-angle excavator boom. The excavating linkage assembly 104 may further comprise a power link steering arm and an idler link steering arm.

As will be appreciated by those practicing the concepts of the present disclosure, it is contemplated that the present disclosure may be utilized with 3D automated grade control technologies for excavators. For example, and not by way of limitation, the present disclosure may be used with excavators utilizing the AccuGrade™ Grade Control System incorporating 3D technologies, the GCS900™ Grade Control System incorporating 3D technologies, the GCSFlex™ Grade Control System incorporating 2D plus global positioning system (GPS) technologies, each of which is available from Trimble Navigation Limited and/or Caterpillar Inc. as add-on or factory installed excavator features.

The excavating linkage assembly 104 may be configured to swing with, or relative to, the machine chassis 102 about a swing axis S of the excavator 100. The excavator stick 110 may be configured to curl relative to the excavator boom 108 about a curl axis C of the excavator 100. The excavating linkage assembly 104 may be configured to define a linkage assembly heading $\hat{N}$ aligned with a reference plane P that is perpendicular to the curl axis C.

The excavator boom 108 and excavator stick 110 of the excavator 100 illustrated in FIG. 1 are linked by a simple mechanical coupling that permits movement of the excavator stick 110 in one degree of rotational freedom relative to the excavator boom 108. In these types of excavators, the linkage assembly heading $\hat{N}$ will correspond to the heading of the excavator boom 108. However, the present disclosure also contemplates the use of excavators equipped with variable-angle excavator booms such as offset booms where the excavator boom 108 and excavator stick 110 are linked by a multidirectional coupling that permits movement in more than one rotational degree of freedom. See, for example, the excavator illustrated in U.S. Pat. No. 7,869,923 ("Slewing Controller, Slewing Control Method, and Construction Machine"). In the case of an excavator with an offset boom, the linkage assembly heading $\hat{N}$ will correspond to the heading of the excavator stick 110. In embodiments, the excavator boom 108 and the excavator stick 110 may be linked by a multidirectional coupling such that the excavator stick 110 rotates about a rotary axis intersecting a coupling between the excavator boom 108 and the excavator stick 110 along the plane P.

The rotary excavating implement 114 may be mechanically coupled to the excavator stick 110 via the implement coupling 112 and configured to rotate about a rotary axis R. The rotary axis R may be defined by the implement coupling 112 or by a coupling joining the excavator boom 108 and the excavator stick 110 such that a leading edge L of the rotary excavating implement 114 defines an implement heading $\hat{I}$.

The control architecture 106 may comprise one or more dynamic sensors 40, 45, one or more linkage assembly actuators, and one or more controllers. The one or more dynamic sensors 40, 45 are shown in FIG. 1 as respectively disposed on the excavator stick 110 and the rotary excavating implement 114. However, the one or more dynamic sensors 40, 45 as described herein may be disposed on alterative locations of the excavator 100, such as on the excavator boom 108 and/or the machine chassis 102 and may comprise tilt and/or rotation angle sensors, as described in greater detail further below. The one or more linkage assembly actuators may facilitate movement of the excavating linkage assembly 104 in either of a manually actuated excavator control system or a partially or fully automated excavator control system. Contemplated actuators include any conventional or yet-to-be developed excavator actuators including, for example, hydraulic cylinder actuators, pneumatic cylinder actuators, electrical actuators, mechanical actuators, or combinations thereof.

Figure 3:
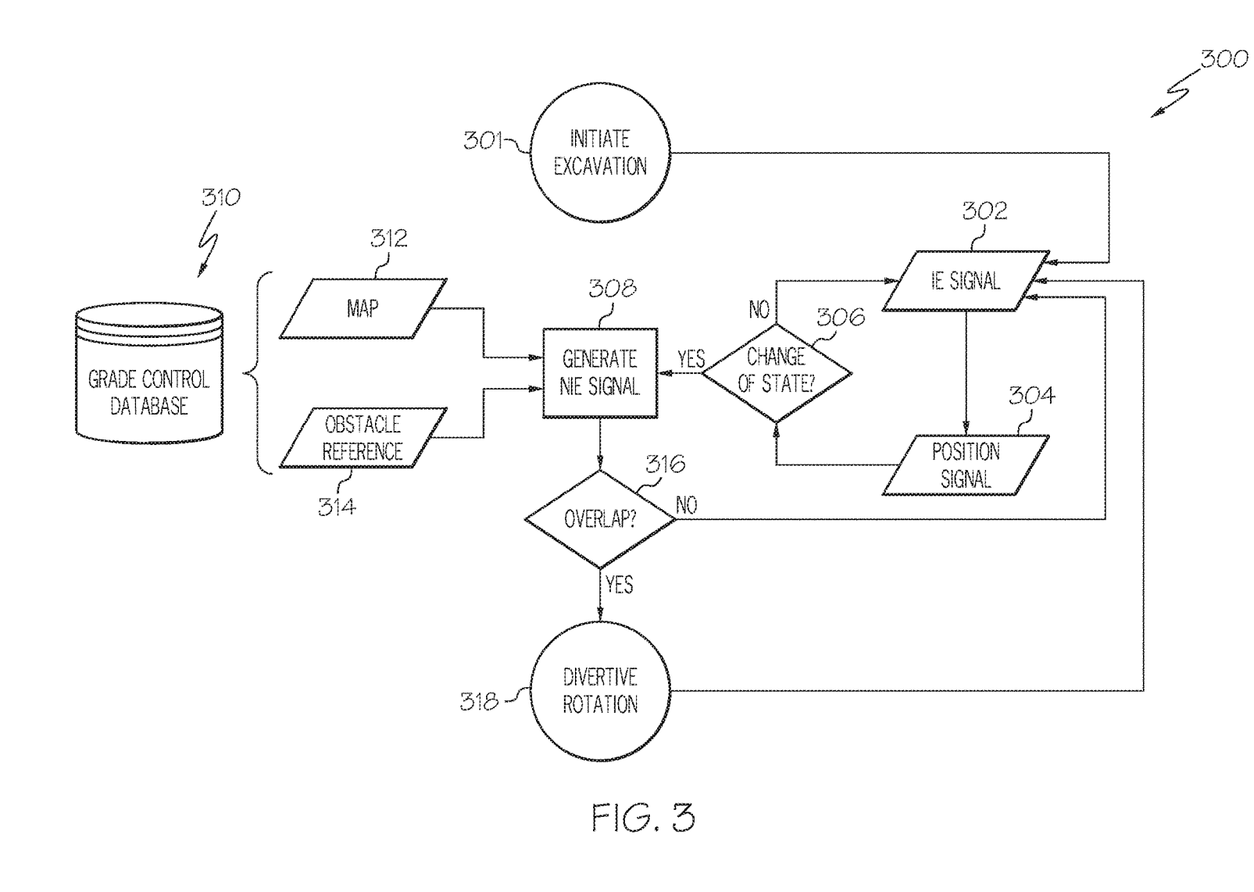
FIG. 3 is a flow chart illustrating instructions implemented by control architecture according to various concepts of the present disclosure.

In one embodiment of the present disclosure, the control architecture 106 comprising one or more controllers programmed to execute machine readable instructions follow a control scheme 300 as shown in FIG. 3, such as to initiate excavation by the excavator 100 step 301. The control architecture 106 may comprise a non-transitory computer-readable storage medium comprising the machine readable instructions.

In a contemplated embodiment, the implement heading $\hat{I}$ may define an implement heading angle $\theta_I$ measured between a heading vector of the rotary excavating implement 114 and the reference plane P that is perpendicular to the curl axis C. Further, referring to FIGS. 3-5, the one or more controllers of the control architecture 106 may be programmed to execute machine readable instructions to utilize position signals from the dynamic sensors 40, 45 to generate a position of the excavator 100 and/or components of the excavator such as a leading edge L of the rotary excavating implement 114 relative to an obstacle reference 140 and map information 312 from a grade control database 310. The obstacle reference 140 may be at least partially based on obstacle reference data 314 from the grade control database 310.

The one or more controllers may further be programmed to utilize implement edge signals from the dynamic sensors 40, 45, in step 302, and the position of the excavator 100 relative to the obstacle reference 140 and map information 312, in step 304, to generate a nearest implement edge signal (also referrable to as "NIE") in step 308. The nearest implement edge signal is indicative of a position of a nearest implement edge 120 of the leading edge L of the rotary excavating implement 114 relative to the obstacle reference 140. In an embodiment, before proceeding to step 308, if no change of state is found in step 306 after steps 302-304, the control scheme 300 does to proceed to step 308 until a change of state is found (such a change has occurred in the implement edge signals of step 302, the position of the excavator 100 of step 304, or both).

Figure 4:
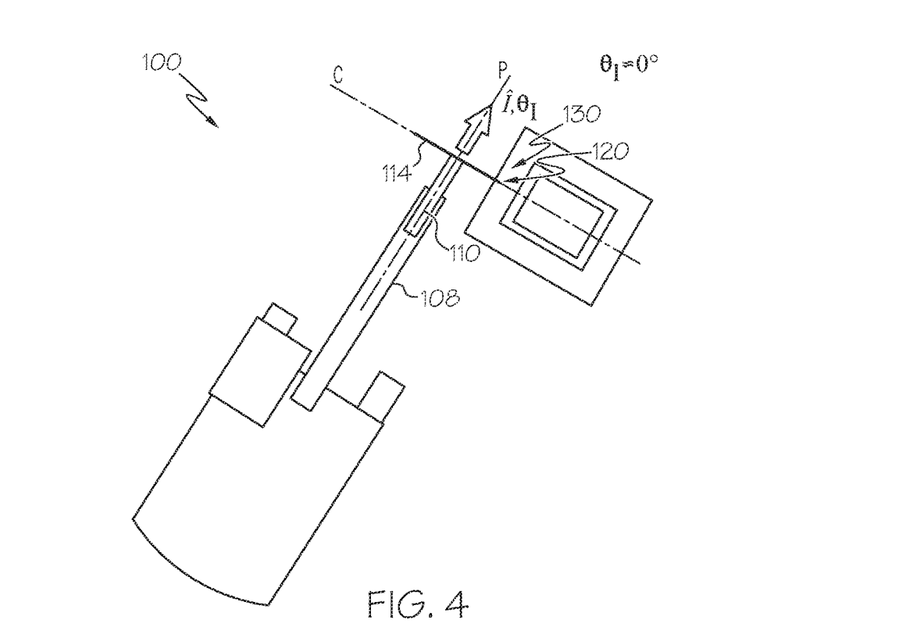
FIGS. 4-5 are top plan views of an excavator illustrating different rotational positions of a rotary excavating implement of the excavator with respect to an obstacle reference according to various concepts of the present disclosure.

The one or more controllers may further be programmed to utilizing the linkage assembly actuators for divertive rotation of the rotary excavating implement 114 about the rotary axis R to adjust the implement heading $\hat{I}$. The degree of divertive rotation about the rotary axis R is sufficient to account for divertive rotation away from substantially all of an actual or projected overlap of the nearest implement edge 120 with the obstacle reference 140. An example of an overlap of the nearest implement edge 120 with the obstacle reference 140 is shown in FIG. 4 through an overlap area 130 illustrating the overlap. Such an actual or projected overlap may be determined in step 316 of the control scheme 300. A determination of no such actual or projected overlap in step 316 returns the control scheme 300 back to step 302. However, a determination of such an actual or projected overlap in step 316 sends the control scheme 300 onto step 318 to initiate divertive rotation prior to returning to step 302.

Figure 5:
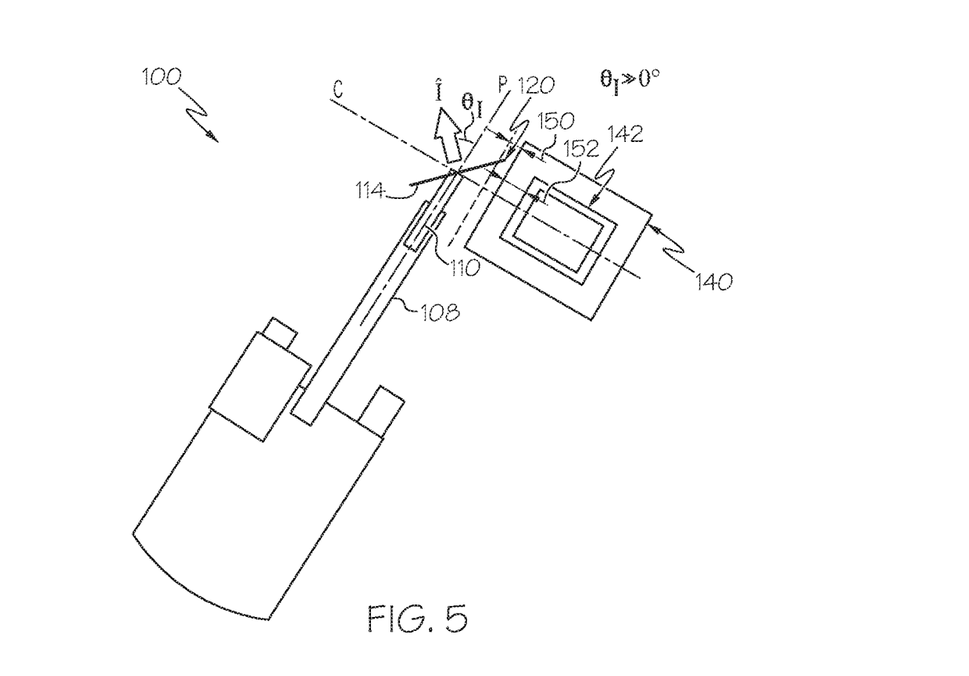

In an embodiment, the obstacle reference 140 may be spaced away from the obstacle 142 at a buffer distance 152. For example, the obstacle reference 140 is disposed about and spaced from a perimeter of an obstacle 142 at a buffer distance 152 that is sufficient to permit the linkage assembly actuators to complete the divertive rotation before the nearest implement edge 120 contacts the obstacle 142. The buffer distance 152 may be 0 inches (0 cm), such as if the nearest implement edge 120 is permitted to approach up to the obstacle reference 140 and not pass it to approach the obstacle 142. The buffer distance 152 may be, as another non-limiting example, in a range of from about 1 inch (2.54 cm) to about 6 inches (15.24 cm). The buffer distance 152 is customizable and may be set by a user such as, for example, an operator.

In an embodiment, the nearest implement edge 120 may overlap the obstacle reference 140 without overlapping or impacting the obstacle 142. For example, the one or more controllers may be programmed such that divertive rotation is initiated when the nearest implement edge 120 overlaps the obstacle reference 140 (and is still spaced away from the obstacle 142). The divertive rotation is terminated when the nearest implement edge 120 no longer overlaps the obstacle reference 140. Additionally or alternatively, the divertive rotation is terminated when the nearest implement edge 120 reaches a predetermined clearance distance 150 away from the obstacle reference 140. The predetermined clearance distance 150 may be in a range of from about 1 inch (2.54 cm) to about 2 inches (5.08 cm), for example. The predetermined clearance distance 150 may be customizable and defined by a user. Further, the one or more controllers may be programmed such that divertive rotation of the rotary excavating implement 114 is between about 0 degrees and about 90 degrees about the rotary axis R.

In another embodiment, the nearest implement edge 120 may be prevented from overlapping the obstacle reference 140 as well as the the obstacle 142. For example, the obstacle reference 140 may be representative of the obstacle 142 itself and/or a selected peripheral area associated with the obstacle 142 that the nearest implement edge 120 should not overlap or breach. For example, the one or more controllers are programmed such that divertive rotation is initiated when the nearest implement edge 120 is within a predetermined approach distance of the obstacle reference 140. The divertive rotation may be terminated when the nearest implement edge 120 is no longer within the predetermined approach distance of the obstacle reference 140. Additionally or alternatively, the divertive rotation is terminated when the nearest implement edge 120 reaches the predetermined clearance distance 150 away from the obstacle reference 140. The predetermined approach distance may be a function of an implement speed, the implement heading $\hat{I}$, or a combination thereof.

In an embodiment, the one or more controllers are programmed to execute machine readable instructions to utilize the linkage assembly actuators for corrective counter-rotation of the rotary excavating implement 114 about the rotary axis R to adjust the implement heading $\hat{I}$ when the divertive rotation exceeds the predetermined clearance distance 150 away from the obstacle reference 140.

The obstacle 142 may include an elevation change, a placed object, or combinations thereof, in an operational terrain upon which the excavator operates. For example, the elevation change could be a slope, a mound, a ditch, or a like type of elevation change of the operational terrain. Further, the placed object may include, for example, a retaining wall, a manhole access point, a sidewalk, or combinations thereof.

Referring back to FIG. 3, the one or more controllers may further be programmed to execute machine readable instructions to utilize position signals from the dynamic sensors 40, 45 to generate a signal representative of the linkage assembly heading $\hat{N}$, and to generate a signal representing the implement heading angle $\theta_I$ based on the linkage assembly heading $\hat{N}$ and the implement heading $\hat{I}$, wherein an adjustment of the implement heading $\hat{I}$, such as through divertive rotation, for example, adjusts the implement heading angle $\theta_I$.

In another contemplated embodiment, the control architecture 106 may comprise a heading sensor configured to generate the linkage assembly heading $\hat{N}$. The dynamic sensors 40, 45 may comprise a GPS sensor, a global navigation satellite system (GNSS) receiver, a Universal Total Station (UTS) and machine target, a laser scanner, a laser receiver, an inertial measurement unit (IMU), an inclinometer, an accelerometer, a gyroscope, an angular rate sensor, a magnetic field sensor, a magnetic compass, a rotary position sensor, a position sensing cylinder, a gravity based angle sensor, an incremental encoder, or combinations thereof. As will be appreciated by those practicing the concepts of the present disclosure, contemplated excavators may employ one or more of a variety of conventional or yet-to-be developed dynamic sensors.

As an example, and not a limitation, the dynamic sensor may comprise a heading sensor configured to generate the linkage assembly heading $\hat{N}$, the implement heading $\hat{I}$, or both, and the heading sensor may comprise a GNSS receiver, a UTS and machine target, an IMU, an inclinometer, an accelerometer, a gyroscope, a magnetic field sensor, or combinations thereof. It is contemplated that the heading sensor may comprise any conventional or yet-to-be developed sensor suitable for generating a signal representing a heading of a component of the excavator 100 such as the excavator boom 108, the excavator stick 110, and/or the rotary excavating implement 114 relative to respective predetermined reference points or vectors in a three-dimensional space, for example. It is contemplated that any of the sensors described herein may be stand-alone sensors or may be part of a combined sensor unit and/or may generate measurements based on readings from one or more other sensors.

In a contemplated embodiment, the dynamic sensor may comprise a rotation angle sensor configured to generate a signal representing a rotation angle of the rotary excavating implement 114. It is contemplated that the rotation angle sensor may comprise any conventional or yet-to-be developed sensor suitable for generating a signal representing the degree of rotation of the rotary excavating implement 114 relative to the reference plane P. For example, and not as a limitation, the dynamic sensors 40, 45 may be any conventional or yet-to-be developed sensors suitable to be configured to calculate the angles and positions of at least a pair of the excavator boom 108, the excavator stick 110, the implement coupling 112, and a tip of the rotary excavating implement 114 with respect to one another, with respect to a benched reference point, or both.

Figure 2:
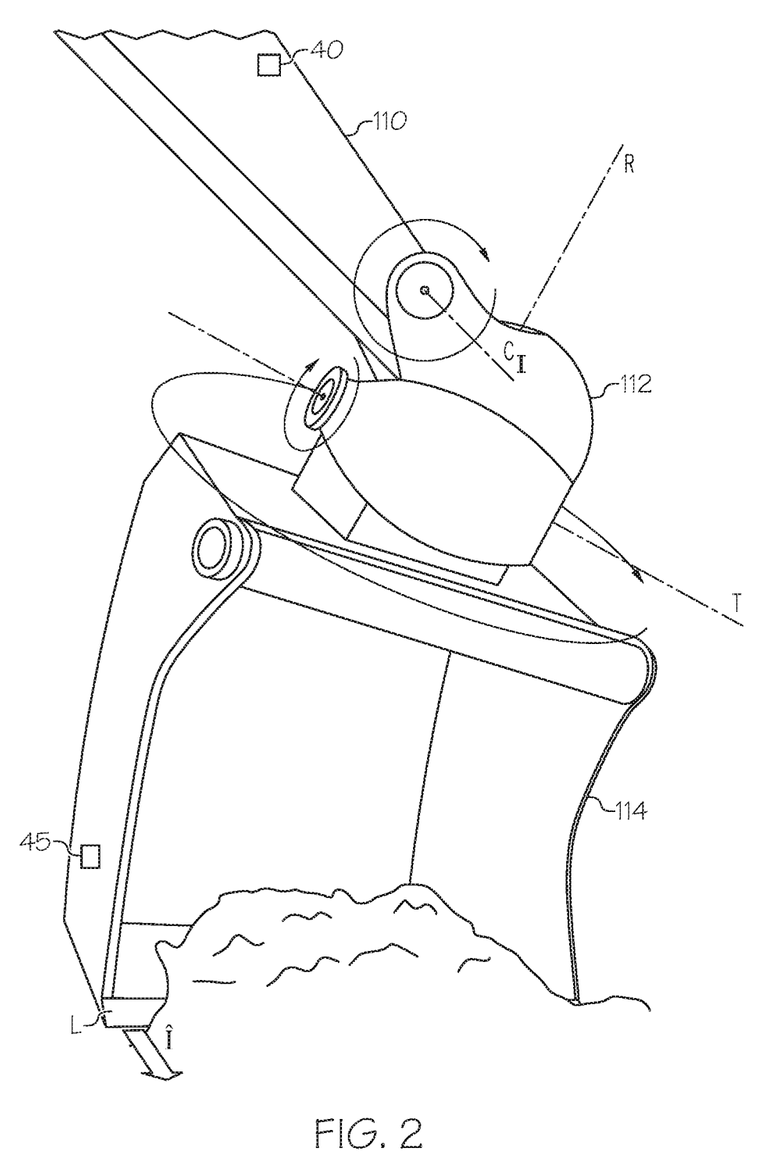
FIG. 2 is an isometric illustration of a rotary excavating implement.

In another contemplated embodiment, the implement coupling 112 may comprise a tilt-rotator attachment that is structurally configured to enable rotation and tilt of the rotary excavating implement 114. For example, referring to FIG. 2, the rotary axis R about which the rotary excavating implement 114 rotates bisects the implement coupling 112, as do an implement curl axis $C_I$ and an implement tilt axis T about which the rotary excavating implement 114 may respectively curl and tilt.

The dynamic sensors 40, 45 may comprise a tilt angle sensor configured to generate a signal representing a tilt angle of the rotary excavating implement 114. Further, a grade control system may include the excavator 100 and the grade control database 310 that includes the map information 312 and the obstacle reference data 314 (which comprises the obstacle reference 140). The control architecture 106 may be responsive to signals generated by the dynamic sensors 40, 45 and configured to execute machine readable instructions to control the tilt angle of the rotary excavating implement 114 via the tilt-rotator attachment to follow the design of a slope for a final graded surface stored in the grade control system. As the bucket is rotated, the system will compare the bucket's tilt angle to a target slope as defined in the grade control system and will automatically command the tilt-rotator attachment to tilt the bucket in a direction which would result in the bucket tilt angle matching the design surface. For example, and not by way of limitation, suitable grade control systems are illustrated in U.S. Pat. No. 7,293,376, which is assigned to Caterpillar Inc. and discloses a grading control system for an excavator.

It is contemplated that the embodiments of the present disclosure may assist to reduce operator fatigue by providing for an excavating heading implement control that may be partially or fully automated and may further result in improved operator and machine productivity and reduced fuel consumption, reduced wear and tear of the machine by such efficient machine usage, and a reduced likelihood of striking a selected object with an excavator implement during operation, for example.

For the purposes of describing and defining the present invention, it is noted that reference herein to a variable being "based" on a parameter or another variable is not intended to denote that the variable is exclusively based on the listed parameter or variable. Rather, reference herein to a variable that is a "based on" a listed parameter is intended to be open ended such that the variable may be based on a single parameter or a plurality of parameters. Further, it is noted that, a signal may be "generated" by direct or indirect calculation or measurement, with or without the aid of a sensor.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. For example, an angle may be approximately zero degrees (0°) or another numeric value that is greater than zero degrees such as 45°. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An excavator comprising a machine chassis, an excavating linkage assembly, a rotary excavating implement, and control architecture, wherein:
the excavating linkage assembly comprises an excavator boom, an excavator stick, and an implement coupling;
the excavating linkage assembly is configured to swing with, or relative to, the machine chassis;
the excavator stick is configured to curl relative to the excavator boom about a curl axis;
the rotary excavating implement is mechanically coupled to the excavator stick by the implement coupling and is configured to rotate about a rotary axis R different from and intersecting the curl axis such that a leading edge of the rotary excavating implement defines an implement heading $\hat{I}$ at least partially based on an implement heading angle $\theta_I$ measured between a heading vector of the rotary excavating implement and a reference plane that is perpendicular to the curl axis; and
the control architecture comprises one or more dynamic sensors, one or more linkage assembly actuators, and one or more controllers programmed to execute machine readable instructions to
utilize position signals from the dynamic sensors to generate a position of the leading edge of the rotary excavating implement relative to an obstacle reference, at least partially based on obstacle reference data from a grade control database, and map information from the grade control database,
utilize implement edge signals from the dynamic sensors and the position of the excavator relative to the obstacle reference and the map information to generate a nearest implement edge signal indicative of a position of a nearest implement edge of the leading edge of the rotary excavating implement relative to the obstacle reference, and
utilize the linkage assembly actuators for divertive rotation of the rotary excavating implement about the rotary axis R to adjust the implement heading $\hat{I}$, wherein the degree of divertive rotation about the rotary axis R is sufficient to account for divertive rotation away from substantially all of an actual or projected overlap of the nearest implement edge with the obstacle reference.

2. An excavator as claimed in claim 1 wherein the one or more controllers are programmed such that divertive rotation is initiated when the nearest implement edge overlaps the obstacle reference.

3. An excavator as claimed in claim 2 wherein the divertive rotation is terminated when the nearest implement edge no longer overlaps the obstacle reference.

4. An excavator as claimed in claim 2 wherein the divertive rotation is terminated when the nearest implement edge reaches a predetermined clearance distance away from the obstacle reference.

5. An excavator as claimed in claim 4 wherein the predetermined clearance distance comprises from about 1 inch (2.54 cm) to about 2 inches (5.08 cm) and is customizable by a user.

6. An excavator as claimed in claim 1 wherein the one or more controllers are programmed such that divertive rotation of the rotary excavating implement is between about 0 degrees and about 90 degrees about the rotary axis R.

7. An excavator as claimed in claim 1 wherein the one or more controllers are programmed such that divertive rotation is initiated when the nearest implement edge is within a predetermined approach distance of the obstacle reference.

8. An excavator as claimed in claim 7 wherein the divertive rotation is terminated when the nearest implement edge is no longer within the predetermined approach distance of the obstacle reference.

9. An excavator as claimed in claim 7 wherein the divertive rotation is terminated when the nearest implement edge reaches a predetermined clearance distance away from the obstacle reference.

10. An excavator as claimed in claim 7 wherein the predetermined approach distance is a function of an implement speed, the implement heading $\hat{I}$, or a combination thereof.

11. An excavator as claimed in claim 1 wherein the one or more controllers are programmed to execute machine readable instructions to utilize the linkage assembly actuators for corrective counter-rotation of the rotary excavating implement about the rotary axis R to adjust the implement heading $\hat{I}$ when the divertive rotation exceeds a predetermined clearance distance away from the obstacle reference.

12. An excavator as claimed in claim 1 wherein the obstacle reference is disposed about and spaced from a perimeter of an obstacle at a buffer distance that is sufficient to permit the linkage assembly actuators to complete the divertive rotation before the nearest implement edge contacts the obstacle.

13. An excavator as claimed in claim 12 wherein the buffer distance is customizable by an operator and comprises from about 1 inch (2.54 cm) to about 6 inches (15.24 cm).

14. An excavator as claimed in claim 12 wherein the obstacle comprises an elevation change, a placed object, or combinations thereof, in an operational terrain upon which the excavator operates.

15. An excavator as claimed in claim 14 wherein the placed object comprises a retaining wall, a manhole access point, a sidewalk, or combinations thereof.

16. An excavator as claimed in claim 1 wherein the control architecture comprises a non-transitory computer-readable storage medium comprising the machine readable instructions.

17. An excavator as claimed in claim 1 wherein the one or more dynamic sensors comprise a global navigation satellite system (GNSS) receiver, a Universal Total Station (UTS) and machine target, an inertial measurement unit (IMU), an inclinometer, an accelerometer, a gyroscope, an angular rate sensor, a rotary position sensor, a position sensing cylinder, a gravity based angle sensor, an incremental encoder, or combinations thereof.

18. An excavator as claimed in claim 1 wherein the one or more dynamic sensors comprise a rotation angle sensor configured to generate a signal representing a rotation angle of the rotary excavating implement.

19. A method of automating tilt and rotation of a rotary excavating implement of an excavator, the method comprising:
providing an excavator comprising a machine chassis, an excavating linkage assembly, a rotary excavating implement, and control architecture comprising one or more dynamic sensors, one or more linkage assembly actuators, and one or more controllers, wherein:
the excavating linkage assembly comprises an excavator boom, an excavator stick, and an implement coupling;
the excavating linkage assembly is configured to swing with, or relative to, the machine chassis about a swing axis S of the excavator;
the excavator stick is configured to curl relative to the excavator boom about a curl axis;

the rotary excavating implement is mechanically coupled to the excavator stick by the implement coupling and is configured to rotate about a rotary axis R different from and intersecting the curl axis such that a leading edge of the rotary excavating implement defines an implement heading Î at least partially based on an implement heading angle $\theta_I$ measured between a heading vector of the rotary excavating implement and a reference plane that is perpendicular to the curl axis;

utilizing position signals from the dynamic sensors to generate a position of the leading edge of the rotary excavating implement relative to an obstacle reference, at least partially based on obstacle reference data from a grade control database, and map information from the grade control database, utilizing implement edge signals from the dynamic sensors and the position of the excavator relative to the obstacle reference and the map information to generate a nearest implement edge signal indicative of a position of a nearest implement edge of the leading edge of the rotary excavating implement relative to the obstacle reference, and utilizing the linkage assembly actuators for divertive rotation of the rotary excavating implement about the rotary axis R to adjust the implement heading Î, wherein the degree of divertive rotation about the rotary axis R is sufficient to account for divertive rotation away from substantially all of an actual or projected overlap of the nearest implement edge with the obstacle reference.

20. A grade control system comprising an excavator and a grade control database, wherein:

the grade control database comprises map information and obstacle reference data comprising an obstacle reference;

the excavator comprises a machine chassis, an excavating linkage assembly, a rotary excavating implement, and control architecture;

the excavating linkage assembly comprises an excavator boom, an excavator stick, and an implement coupling;

the excavating linkage assembly is configured to swing with, or relative to, the machine chassis;

the excavator stick is configured to curl relative to the excavator boom about a curl axis;

the rotary excavating implement is mechanically coupled to the excavator stick by the implement coupling and is configured to rotate about a rotary axis R different from and intersecting the curl axis such that a leading edge of the rotary excavating implement defines an implement heading Î at least partially based on an implement heading angle $\theta_I$ measured between a heading vector of the rotary excavating implement and a reference plane that is perpendicular to the curl axis; and the control architecture comprises one or more dynamic sensors, one or more linkage assembly actuators, and one or more controllers programmed to execute machine readable instructions to utilize position signals from the dynamic sensors to generate a position of the leading edge of the rotary excavating implement relative the obstacle reference and the map information from the grade control database, utilize implement edge signals from the dynamic sensors and the position of the excavator relative to the obstacle reference and the map information to generate a nearest implement edge signal indicative of a position of a nearest implement edge of the leading edge of the rotary excavating implement relative to the obstacle reference, and utilize the linkage assembly actuators for divertive rotation of the rotary excavating implement about the rotary axis R to adjust the implement heading Î, wherein the degree of divertive rotation about the rotary axis R is sufficient to account for divertive rotation away from substantially all of an actual or projected overlap of the nearest implement edge with the obstacle reference.

* * * * *

UNITED STATES PATENT AND TRADEMARK OFFICE
CERTIFICATE OF CORRECTION

PATENT NO. : 9,976,285 B2
APPLICATION NO. : 15/221188
DATED : May 22, 2018
INVENTOR(S) : Christopher Padilla It is certified that error appears in the above-identified patent and that said Letters Patent is hereby corrected as shown below:

Column 2, Line 56:
"rotary excavating implement relative the obstacle reference"
Should read:
--rotary excavating implement relative to the obstacle reference--; and Column 5, Line 18:
"control scheme 300 does to proceed to step 308 until a"
Should read:
--control scheme 300 does not proceed to step 308 until a--; and Column 5, Line 23:
"to utilizing the linkage assembly actuators for divertive"
Should read:
--to utilize the linkage assembly actuators for divertive--.

Signed and Sealed this
Sixth Day of November, 2018

Andrei Iancu
*Director of the United States Patent and Trademark Office*